June 5, 1923.
G. C. ATKINSON
1,458,020
RESILIENT WHEEL
Filed March 22, 1922
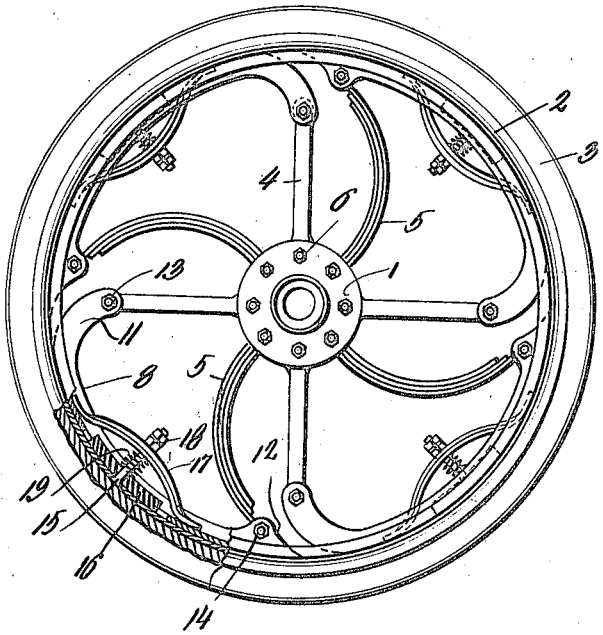
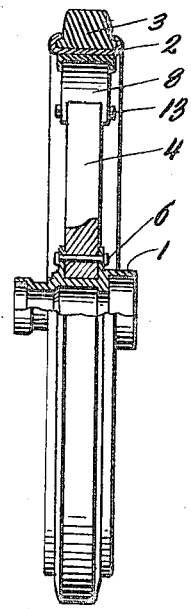
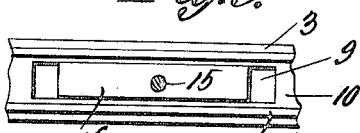
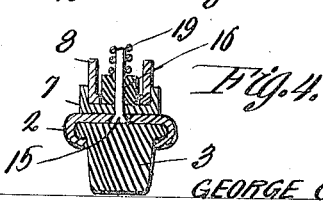
GEORGE C. ATKINSON
INVENTOR.
BY
ATTORNEY.

Patented June 5, 1923.

1,458,020

UNITED STATES PATENT OFFICE.

GEORGE C. ATKINSON, OF GEORGETOWN, TEXAS.

RESILIENT WHEEL.

Application filed March 22, 1922. Serial No. 545,909.

*To all whom it may concern:*

Be it known that I, GEORGE C. ATKINSON, a citizen of the United States, residing at Georgetown, in the county of Williamson and State of Texas, have invented certain new and useful Improvements in Resilient Wheels, of which the following is a specification.

This invention relates to resilient wheels and has for its principal object to generally improve upon the structure disclosed in Letters Patent 1,406,961 dated Feb. 21, 1922, by providing means for resiliently holding the rim driving elements in engagement with the rim.

With the above and other objects in view the invention resides in the details of construction, combination and arrangement of parts as are hereinafter more fully described and pointed out specifically in the appended claims.

In the drawings:—

Figure 1 is a side elevational view of a wheel constructed in accordance with the principle of the invention, a portion thereof being shown in section, Figure 2 is an edge elevation of the wheel showing the upper half thereof in transverse section, Figure 3 is a fragmentary plan view of the rim driving element, and Figure 4 is a section taken transversely through the rim driving element and the rim.

Referring to the drawing in detail it will be seen that the wheel consists of a hub 1 which may be of any preferred construction having usual spoke receiving sockets therein in which are situated the spokes 4 and the resilient members 5 which are alternately arranged thereabout. These spokes 4 and resilient members 5 are securely held in the sockets of the hub 1 by the bolts and nuts indicated generally at 6. The wheel rim 2 is constructed so as to hold a solid or pneumatic tire 3 in the usual manner. An annular member 7 of U-shaped cross section is situated on the inner periphery of the rim 2 and if so desired may be made integral therewith for receiving rim driving elements indicated generally at 8. These rim driving elements form a sectional felly and are preferably slightly spaced from each other as indicated in Figure 1. Each rim driving element consists of an elongated body portion of U-shaped construction in cross section to provide a flat bearing surface or bottom curved in conformity with the curvature of the wheel rim or member 7 against which it is designed to rest. These rim driving elements differ from those shown in these Letters Patent above mentioned in that each is provided with an elongated slot 9 in its bottom portion 10. The side flanges of the rim driving elements are inclined upwardly from one end to provide the curved nose portions 11 while at their opposite ends they are provided each with a curved bearing surface 12, each rim driving element being arranged so that the nose portion of the subsequent rim driving element is adjacent to the rear bearing surface 12 of the preceding one. Each of the spokes 4 are adapted to have one rim driving element connected thereto by means of a bolt or other fastening element 13 inserted through the nose portions 11 and passing through a suitable opening formed adjacent the end of the spokes thus serving as a pivot about which this rim driving element may be moved. At the free end of each rim driving element there is arranged a bolt or other member 14 which passes through a suitable opening in the flanges thereof and is suitably secured to one end of one of the adjacent resilient members 5. These resilient members are flexed so as to be normally under tension with the brunt of their expansive force exerted against the ends having the curved bearing surfaces 12 of the rim driving elements thereby giving these elements a tendency to swing outwardly about the pivot 13 so that they will thus be caused to fit up against the rim of the wheel, the resilient members 5 tending to hold them in close frictional contact therewith.

Bolts 15 have their heads suitably embedded in the bottom of the rim 2 and one passes through each of the members 7 and also through the slot 9 in each of the rim driving elements 8. A fiber lug or block 16 is disposed in each slot 9 so that its ends are suitably spaced from the ends of the slot and the respective bolt 15 passes therethrough. A half elliptical leaf spring 17 is so situated as to straddle each slot 9 and has its ends bearing on the bottom 10 of the respective rim driving element 8. Each bolt 15 passes through one of the half elliptical springs 17 and a suitable nut 18 is provided on the end of the bolt whereby the spring may be tensioned as desired. An expansible coil spring 19 is disposed about each of the bolts 15 so as to be situated between the respective lug 16 and spring 17. This structure just described resiliently holds the rim driving elements 8 in frictional engagement with the rim portion of the wheel which is sufficient for normal purposes. However should the rim portion of the wheel become stuck in mud for instance and the friction between the rim driving elements and the rim not be sufficient to prevent them from sliding in relation to each other it will be seen that the lugs 16 would act as a positive means for preventing the sliding of the rim driving elements in relation to the rim portion of the wheel to any great extent. This structure formed by the springs 17 and their cooperating parts also give additional resiliency to the wheel as a whole since as the rim engaging elements fulcrum upon the pivots 13 this motion is resisted also by the springs 17 as well as by the resilient members 5.

Having thus described my invention what I claim as new is:

1. A resilient wheel comprising a hub, a rim, a felly formed of a plurality of driving elements, means for resiliently connecting the driving element of the felly to the hub, each driving element provided with a slot, a plurality of bolts fastened to the rim and passing through the slots in the driving elements, a leaf spring mounted on each bolt and having its ends bearing against the driving element so as to hold the same in frictional engagement with the inner circumferential face of the rim, and an expansible coil spring disposed about each bolt so as to be situated between the leaf spring and the rim.

2. A resilient wheel comprising a hub, spokes radiating therefrom, a plurality of members, one pivoted to each spoke and curved to form a separate felly section, springs connecting the free ends of the members to the hub, an encircling rim supported by said members and resilient means disposed intermediately of each member and tensioned to hold the members in frictional engagement with the rim.

In testimony whereof I affix my signature in presence of two witnesses.

GEORGE C. ATKINSON.

Witnesses:
W. F. MAGEE,
W. S. ARMSTRONG.